Aug. 11, 1936.         L. SIMON         2,050,672
PRESSURE RELIEF DEVICE FOR SHOCK ABSORBERS
Filed Dec. 27, 1934
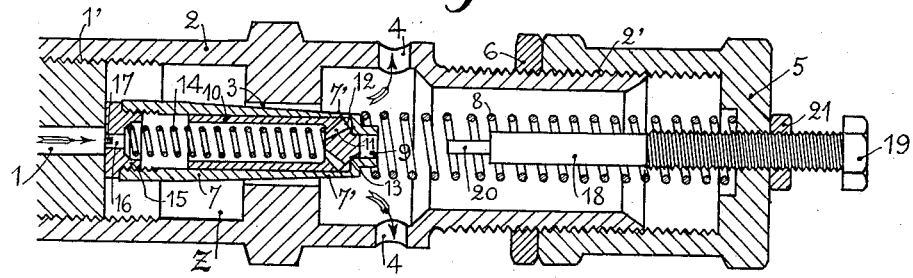
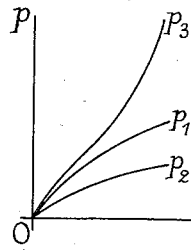 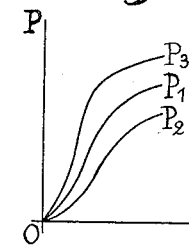 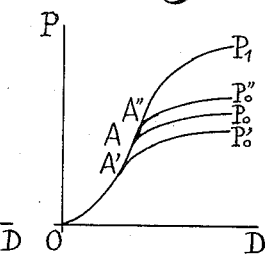 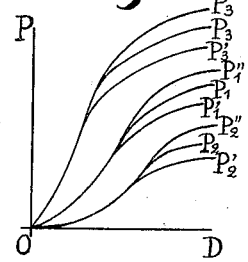
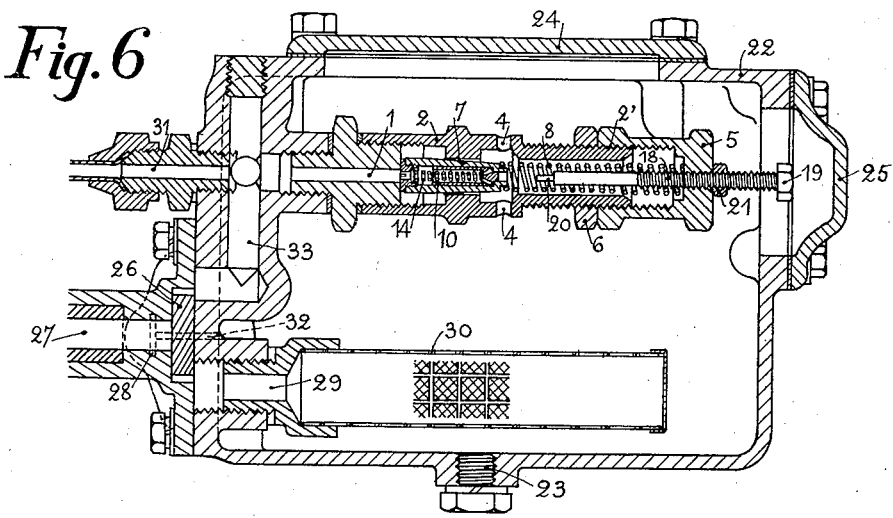
Inventor:
Lucien SIMON
by C.A.Snow&Co.
Attorneys.

Patented Aug. 11, 1936

2,050,672

UNITED STATES PATENT OFFICE 2,050,672

PRESSURE RELIEF DEVICE FOR SHOCK ABSORBERS

Lucien Simon, Paris, France, assignor to Societe d'Exploitation des Brevets Lucien Simon (Amortisseurs Sanchok) Societe Anonyme, Paris, France Application December 27, 1934, Serial No. 759,393
In France June 2, 1934

5 Claims. (Cl. 277—1)

The present invention relates to pressure relief devices and especially to devices of this kind adapted to be used in connection with shock absorbers for vehicle suspensions and also with the pumps of shock absorbers for stationary plants.

The object of the present invention is to provide a pressure relief device which is better adapted to meet the requirements of actual practice.

It is known that some shock absorbers are adjusted by the pressure of a liquid fed to said shock absorbers through a system of pipes connected with the continuous flow conduit of a pump driven by a moving organ of the apparatus with which the shock absorbers are to cooperate, this system being combined with a pressure relief device connected with the liquid return conduit and arranged to act on the rate of flow in this conduit as a function of the speed of the driving organ above referred to.

Pressure relief devices of this kind comprise an inlet organ and a stopping organ combined therewith, one of these two organs being stationary and the other one being movable and urged toward the position in which the inlet organ is stopped by elastic means, while the stationary element, or the movable element, or both of them are provided with one or several relief surfaces or passages arranged in such manner that the section of flow in the return conduit increases, in a continuous or intermittent manner, as a function of the working conditions of the driving organ.

It has been found experimentally that, on the one hand, the increase of the pressure applied to the shock absorbers became insufficient when the vehicle is running at high speeds with existing pressure relief devices, and on the other hand that the curve of oil pressures in the cold state is located distinctly above the curve of oil pressures in the hot state. Furthermore it is a known fact that the pressure relief devices used up to this time cannot be adjusted in a satisfactory manner.

A first object of the pressure relief device according to the present invention is to obviate the first of the above mentioned drawbacks.

The pressure relief device according to the present invention is characterized in that the stationary element, the movable element, or both of these elements of the device are provided with one or several relief surfaces disposed in such manner that the section of flow through the return conduit decreases as the movable element is moving under the effect of an increasing pressure.

Owing to this arrangement, the curve of pressures that is obtained is straighter than the curve of pressures obtained with existing devices and therefore ensures a better working of the device at high speeds.

In order to eliminate the influence of variations of viscosity of the liquid that is propelled, the pressure relief device according to the present invention is further characterized in that the movable element is provided with supplementary orifices for the expansion of the liquid, a suitable number of these orifices being provided and said orifices being so arranged as to remain closed during the first portion of the stroke of the movable element in the direction that compresses the elastic return organ and to be opened at a suitable point of said stroke.

The present invention further includes means for modifying the initial resistance of this elastic return organ and also means for varying the point of the stroke of the movable element at which the expansion orifices open. These means make it possible to adjust the working of the pressure relief device in a very satisfactory manner.

Preferred embodiments of the present invention will be hereinafter described with reference to the accompanying drawing, given merely by way of example, and in which:

Fig. 1 is a longitudinal sectional view of a pressure relief device according to the present invention;

Fig. 2 is a diagram showing several curves in which the pressures are plotted in ordinates and the rates of flow in abscissas, said curves corresponding to different shapes of the cooperating elements of the pressure relief device;

Fig. 3 is a diagram showing curves of the same kind and illustrating how the shape of said curves may be varied by adjusting the strength of the spring included in the device;

Fig. 4 is a diagram showing the same kind of curves and illustrating the possibility of varying the shape of said curves by suitably positioning the stop that controls the discharge valve of the device;

Fig. 5 is a diagram showing a plurality of curves of the same kind, illustrating the possibility of varying the shape of these curves by varying both the strength of said spring and the position of said stop;

Fig. 6 is a sectional view of a device according to the present invention permitting to adjust the conditions of working of shock absorbers in vehicle suspensions or to stationary plants.

In Fig. 1 of the appended drawing, 1 represents the return pipe for a liquid, oil for instance propelled by a suitable pump. On the threaded end 1' of this pipe is mounted a tubular body 2 provided with inner threads and including a central bearing 3. On one side of this bearing is a chamber Z and on the other side a chamber provided with outlet orifices 4. On the threaded end 2' of this tubular body is mounted a cap 5 and a lock nut 6. In the central bearing 3 is slidably mounted a tubular obturating organ 7 provided with longitudinal hollow portions 7' consisting of flat surfaces the inclination of which is such that the section of flow decreases as the obturating organ is moving under the pressure of the liquid. This obturating organ 7 is urged against the end of pipe 1 by a spring 8 bearing upon the end of cap 5. The end 9 of tubular organ 7 is stopped by a valve 10 provided with discharge ports 11 and the conical end 12 of which is applied against a correspondingly shaped surface 13 of element 7 by a spring 14 bearing at the other end against a threaded plug 15 screwed in the end of tubular organ 7. This plug 15 is provided with a conduit 16 extending throughout it so as to permit oil to flow into valve member 10. Plug 15 is further provided with a slot 17 which permits to screw plug 15 in position and further ensures leakage of oil so as to permit the correct working of the pressure relief device when the latter is started.

A rod 18 the head 19 of which is in the shape of a nut is provided with a screw threaded part screwed in the end of cap 5. Said rod is so arranged that the axis of its end 20, acting as a stop, is coaxial with tubular organ 7. A lock nut 21 is provided for locking stop 20 in the desired position with respect to the initial position of organ 7.

The working of the pressure relief device above described takes place as follows:

When the pump that serves to propel oil in the system is started, the oil flowing through return pipe 1 escapes through slot 17 and recesses 7' and it is fed back to the reservoir through orifices 4. As soon as the oil pressure in chamber Z reaches a sufficiently high value for overcoming the resistance of spring 8, the latter is compressed and organ 7 is moved, thus modifying the section of flow through recesses 7' engaged in bearing 3, as a function of the position of said organ 7 with respect to said part 3.

Supposing that the oil pressure in conduit 1 increases, the return spring 8 is more and more compressed and the obturating organ 7 is kept moving in the same direction until the end of valve member 10 comes into contact with stop 20. If, then, obturating organ 7 is further moved, due to an increase of the oil pressure, the portion 12 of the valve member remains stationary, spring 14 being compressed, and oil escapes through ports 11 into the space existing between part 12 and seat 13. Oil, which is no longer compelled to pass through recesses 7' of the obturating organ 7, therefore flows freely, which has for its effect to reduce the slope of the curve of pressures and eventually to stabilize the pressure at a point the position of which is determined by the adjustment of stop 20 and which is wholly independent of the conditions of viscosity of the oil or any other liquid which is employed. Therefore, the first result of the arrangement above described is to eliminate the effect of variations of temperature on the device, which variations influence, especially at the start, the viscosity of said liquid.

In a general manner, the possibility of adjusting the resistance of spring 8 and the position of stop 20, which controls the opening of the discharge orifices permit of efficiently adjusting the device and of quickly adapting it to various apparatus and conditions of use.

As a matter of fact, considering a pump ensuring a continuous flow of oil or any other liquid, and connected with a return pipe of uniform section, if the rates of flow are plotted in abscissas and the corresponding pressures in ordinates, I obtain a curve $P_1$ (Fig. 2). If, on the return pipe there is mounted a pressure relief device in which the hollow portions corresponding to 7' have inclined flat bottoms so devised that the section of flow increases as the antagonistic spring is compressed, the curve that is obtained is $P_2$. On the contrary, if the grooves or hollow parts 7' are so shaped that the section of flow decreases as the antagonistic spring is more and more compressed, the curve that is obtained is $P_3$.

It is therefore quite clear that it is possible, by acting on the shape of the hollow portions or grooves of the movable organ to combine the three curves above referred to in such manner as to obtain a curve of pressures which is more satisfactory, such as curve $P_1$ (Fig. 3). By acting on cap 5 it is possible to adjust the strength of spring 8. When this strength is increased the curve of pressures becomes analogous to $P_2$; when it is reduced the curve becomes analogous to $P_3$.

All these curves are obtained without bringing into play the possibility of adjusting the position of stop 20. Considering (Fig. 4) a curve $P_1$ of the type above mentioned, if this stop is adjusted in such manner as to produce the opening of discharge valve 10 at point A, the curve of pressures is modified from this point, becoming for instance $P_0$. It is even possible, if necessary, to stabilize the curve at a maximum of pressure which is independent of the increases of the oil pressure beyond this point A. In a likewise manner, I can obtain curves $P_0'$ or $P_0''$ by moving stop 20 toward the valve member or away from it.

Finally, by grouping on the same figure the curves obtained by means of the two systems of adjustment above mentioned, I obtain (Fig. 5), for three different positions of the seat 5 of the spring and three different positions of stop 20, three curves P, P', P'', which themselves subdivide into curves $P_1$, $P_1'$, $P_1''$, $P_2$, $P_2'$, $P_2''$, $P_3$, $P_3'$, $P_3''$.

It will readily be understood that with the devices which have just been described, the pressure relief device according to the present invention possesses possibilities of adjustment within a very wide range which greatly facilitates its adaptation to very different utilizations: automobile vehicles, railroad vehicles, stationary plants, etc.

It is pointed out that the use of a discharge valve and the possibilities of adjustment that have just been described are not at all limited to pressure relief devices in which the recesses 7 for the flow of the liquid have flat bottoms inclined in the manner above described. This discharge device and the adjustment system above described might be used in combination with relief devices having discharge recesses or grooves of any shape corresponding to any particular case.

It should be further noted that it may be advantageous to provide screw threads of the same pitch for the threaded end 2' of tubular body 2 and for the threaded part of rod 18 because, with such an arrangement it is possible to modify one of the adjustments without varying the other. If, for instance, the operative desires to give a rotation of two turns to cap 5 so as to move the seat of spring 8 toward the valve device without modifying the position of stop 20, it suffices, either to keep head 19 stationary during this movement, or to leave it free and to give it subsequently a rotation of two turns in the opposite direction.

Fig. 6 shows a system provided with a pressure relief device according to the present invention and intended to permit the adjustment of shock absorbers for vehicle suspensions or of shock absorbers for deadening the vibrations of stationary plants. In this figure 22 designates the oil casing with discharge plug 23 and upper lid 24. A lateral lid 25 makes it possible to reach adjustment devices 5 and 19. Pump 26, the shaft 27 of which is driven, for instance, through a flexible transmission, itself operatively connected with the gear box of the vehicle, draws oil from casing 22 through filter 30 and conduit 29 and discharges it into conduit 33 to which is connected the return conduit 1 and the pipes 31 leading to the shock absorbers. Leakage past shaft 27 is prevented by means of an annular groove 28 connected to the casing by a conduit 32. The object of this groove is to collect oil that has leaked along the pump driving shaft and to feed it back to casing 22 by means of conduit 32.

While I have, in the above description, disclosed what I deem to be practical and efficient embodiments of the present invention, it should be well understood that I do not wish to be limited thereto as there might be changes made in the arrangement, disposition and form of the parts without departing from the principle of the present invention as comprehended within the scope of the appended claims.

What I claim is:

1. A pressure relief device of the kind described which comprises, in combination, an inlet organ provided with a passage for liquid, another organ movable with respect to the first mentioned organ and adapted to cooperate therewith so as to be able to close said passage, elastic means between said two organs for urging them toward the relative position thereof in which the second mentioned organ closes said passage, cooperating surfaces carried by said two organs respectively adapted to vary the section of flow through said inlet organ when said organs are moved with respect to each other under the effect of an increase of liquid pressure, at least one of said organs being provided with orifices which are adapted, when open to substantially increase the section of flow through said inlet organ, means for closing said orifices during the first part of the relative displacement of said second mentioned organ with respect to the first mentioned one against the action of said elastic means, and means for opening said orifices at the end of said displacement.

2. A device according to claim 1 in which the last mentioned means are adjustable so as to permit of varying the point of the relative displacement of said second member at which these orifices are opened.

3. A device according to claim 1 further including means for adjusting the last mentioned means so as to permit of varying the point of the relative displacement of the second mentioned organ at which said orifices are opened, and means for adjusting the strength of said elastic means.

4. A pressure relief device of the kind described, which comprises, in combination, an inlet organ provided with a passage for liquid, a tubular organ movable in the first mentioned organ and adapted to cooperate therewith so as to be able to close said passage, a cap screwed on said first mentioned organ, a spring interposed between said cap and said second mentioned organ for urging the latter toward the position thereof in which it closes said passage, cooperating surfaces carried by said organs respectively adapted to reduce the section of flow through said inlet organ when said second mentioned organ is moved therein against the action of said spring under the effect of an increase of liquid pressure, a valve mounted in said tubular organ adapted to close it, elastic means for keeping said valve member in the closed position, and an adjustable stop carried by said cap and adapted to coact with said valve member so as to open it at a given point of the displacement of said tubular organ in said outlet organ.

5. A pressure relief device of the kind described which comprises, in combination, an inlet organ provided with a passage for liquid, another organ movable with respect to the first mentioned organ and adapted to cooperate therewith so as to be able to close said passage, elastic means between said two organs for urging them toward the relative position thereof in which the second mentioned organ closes said passage, cooperating surfaces carried by said two organs respectively, adapted to vary the section of flow through said inlet organ when said organs are moved with respect to each other under the effect of an increase in the liquid pressure, at least one of said organs being provided with orifices which are adapted, when open, to substantially increase the section of flow through said inlet organ, means for closing said orifices during the first part of the relative displacement of said second mentioned organ with respect to the first mentioned one against the action of said elastic means, and means for opening said orifices when said organs occupy a predetermined relative position with respect to each other in the course of said last mentioned relative displacement of said organs.

LUCIEN SIMON.